US007281653B2

(12) United States Patent
Beck et al.

(10) Patent No.: US 7,281,653 B2
(45) Date of Patent: Oct. 16, 2007

(54) TRANSACTION INSTRUMENT INVENTORY MANAGEMENT SYSTEM AND METHOD

(75) Inventors: Randy Beck, Alpine, UT (US); Sven Miller, Salt Lake City, UT (US); Clyde Page, South Jordan, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 248 days.

(21) Appl. No.: 10/905,889

(22) Filed: Jan. 25, 2005

(65) Prior Publication Data

US 2005/0199707 A1    Sep. 15, 2005

Related U.S. Application Data

(60) Provisional application No. 60/522,955, filed on Nov. 24, 2004, provisional application No. 60/553,781, filed on Mar. 17, 2004, provisional application No. 60/552,842, filed on Mar. 12, 2004.

(51) Int. Cl.
*G06K 5/00* (2006.01)

(52) U.S. Cl. .................... 235/380; 235/379

(58) Field of Classification Search ............ 235/379, 235/380, 381, 375, 383; 705/35
See application file for complete search history.

(56) References Cited

U.S. PATENT DOCUMENTS

| 5,577,109 | A | 11/1996 | Stimson et al. | |
|---|---|---|---|---|
| 5,621,787 | A | 4/1997 | McKoy et al. | |
| 5,760,381 | A | 6/1998 | Stich et al. | |
| 5,777,305 | A | 7/1998 | Smith et al. | |
| 5,903,633 | A | 5/1999 | Lorsch | |
| RE36,365 | E | 11/1999 | Levine et al. | |
| 6,000,608 | A | 12/1999 | Dorf | |
| 6,000,832 | A | 12/1999 | Franklin et al. | |
| 6,032,136 | A | 2/2000 | Brake, Jr. et al. | |
| 6,175,823 | B1 | 1/2001 | Van Dusen | |
| 6,189,787 | B1 | 2/2001 | Dorf | |
| RE37,122 | E | 4/2001 | Levine et al. | |
| 6,298,336 | B1 | 10/2001 | Davis et al. | |
| 6,386,457 | B1 | 5/2002 | Sorie | |
| 6,422,459 | B1 | 7/2002 | Kawan | |
| 6,467,684 | B2 | 10/2002 | Fite et al. | |
| 6,473,500 | B1 | 10/2002 | Risafi et al. | |
| 6,502,745 | B1 | 1/2003 | Stimson et al. | |
| 6,575,361 | B1 * | 6/2003 | Graves et al. | ............. 235/380 |
| 6,581,827 | B2 | 6/2003 | Welton | |
| 6,612,487 | B2 | 9/2003 | Tidball et al. | |
| 6,805,289 | B2 * | 10/2004 | Noriega et al. | ............. 235/380 |
| 6,892,187 | B2 * | 5/2005 | Phillips et al. | ............. 705/41 |
| 6,991,157 | B2 * | 1/2006 | Bishop et al. | ............. 235/379 |
| 2001/0001856 | A1 | 5/2001 | Gould et al. | |

(Continued)

*Primary Examiner*—Ahshik Kim
(74) *Attorney, Agent, or Firm*—Fitzpatrick, Cella, Harper & Scinto

(57) ABSTRACT

A system and method for facilitating inventory management in financial transaction instrument distribution is disclosed. The method may include the steps of: receiving information related to the sale of a first transaction instrument, wherein the first transaction instrument is associated with a second transaction instrument, wherein the first and second transaction instruments comprise a group of transaction instruments, and wherein the information identifies a location of the sale of the first transaction instrument; and associating the location of the sale of the first transaction instrument with the second transaction instrument and/or the group of transaction instruments.

13 Claims, 3 Drawing Sheets

U.S. PATENT DOCUMENTS

| | | |
|---|---|---|
| 2001/0042784 A1 | 11/2001 | Fite et al. |
| 2002/0046341 A1 | 4/2002 | Kazaks et al. |
| 2002/0077973 A1 | 6/2002 | Ronchi et al. |
| 2002/0091573 A1 | 7/2002 | Hodes |
| 2002/0099667 A1 | 7/2002 | Diamandis et al. |
| 2002/0117541 A1 | 8/2002 | Biggar et al. |
| 2002/0174016 A1 | 11/2002 | Cuervo |
| 2003/0004828 A1 | 1/2003 | Epstein |
| 2003/0197059 A1 | 10/2003 | Tidball et al. |
| 2003/0200179 A1 | 10/2003 | Kwan |
| 2003/0212796 A1 | 11/2003 | Willard |
| 2004/0011864 A1 | 1/2004 | Thompson et al. |
| 2004/0011866 A1 | 1/2004 | Saad |

* cited by examiner

TRANSACTION INSTRUMENT INVENTORY MANAGEMENT SYSTEM AND METHOD

CROSS-REFERENCE TO RELATED APPLICATIONS

This application claims priority to, and the benefit of, U.S. Provisional Application Ser. No. 60/552,842, entitled "SYSTEM, METHOD FOR PRE-PAID CARD RETAIL DISTRIBUTION," filed Mar. 12, 2004; U.S. Provisional Application 60/553,781, entitled "SYSTEM, METHOD FOR DISTRIBUTION OF GIFT CARDS," filed Mar. 17, 2004; and U.S. Provisional Application 60/522,955, entitled "PREPAID CARD IN-PERSON RETAIL DISTRIBUTION INVENTORY MANAGEMENT PROCESS," filed Nov. 24, 2004, which are incorporated herein by reference.

FIELD OF INVENTION

The invention generally relates to transaction instruments, and more particularly, to inventory management systems and methods for facilitating the distribution of transaction instruments.

BACKGROUND OF INVENTION

Consumers may use a financial transaction account, which may be associated with an account number and/or transaction instrument (e.g., charge card, credit card, debit card, gift card, etc.), as a form of payment or for identification in various transactions. However, sufficient inventory management systems and tracking methods do not exist for distribution of many financial transaction instruments.

Distribution of financial transaction instruments may involve the distribution of physical objects directly to retail locations or through a distribution chain. Distribution of, for example, charge cards may take place through various third party distribution centers and distributors in a supply chain. Such systems are not generally configured for detailed tracking of inventory, and systems are generally not in place or sufficient to facilitate providing timely or useful information to the issuer of the transaction instrument.

These limitations on the ability to track inventory have historically not been a strong concern because the product being distributed and/or the method of distributing the product did not raise significant security, loss prevention, and re-claim issues. For example, distributed cards have typically been closed cards. "Closed cards" are cards that may be restricted to use in a particular store or within a particular chain of a stores. One example of a closed card is a pre-paid gift card that may only be purchased at, and only be accepted at, a clothing retailer, such as The Gap®. In contrast, "Open cards" are cards that are generally accepted at different merchants. Examples of open cards include American Express®, Visa®, and Discover®, MasterCard® cards, which may be used at many different retailers and other businesses.

A relatively low level of concern often exists for loss control and inventory management in the distribution of transaction instruments that are closed system, valueless, and/or non-expiring cards in comparison to open system, pre-paid, and/or expiring transaction instruments. As such, the conventional wisdom has been that detailed tracking of the distribution of prepaid cards, charge cards, credit cards, and the like, may not be cost effective. By way of example, closed cards generally do not have expiration dates; and because of this, there typically has been no reason to reclaim the unsold cards after a period of time has elapsed.

However, it is presently becoming desirable to distribute open financial transaction instruments (e.g., open debit/credit cards) in a publicly accessible manner. For example, it is desirable to hang an open card on a rack in high foot traffic areas of a store. Such a method of distributing may tend to increase the effectiveness of card distribution. However, open cards may have an expiration date associated with the card. Furthermore, the distribution of open cards may increase the need for of security measures.

Thus, there exists a need for systems and methods that facilitate determining the location of a financial transaction instrument (e.g., a card) and reclaiming the financial transaction instrument in advance of its expiration date. More generally, there exist a need for inventory management systems and methods that can track the distribution of open financial transaction instruments.

SUMMARY OF INVENTION

The invention generally relates to inventory management systems and methods for facilitating the distribution and tracking of financial transaction instruments. Some exemplary systems may be described as "reverse inventory management systems" because, in contrast to systems that track location from production through distribution, exemplary systems may be configured to identify the location of some inventory after the sale of other related inventory. One exemplary method may include the steps of: receiving information related to the sale of a first transaction instrument, wherein the first transaction instrument is associated with a second transaction instrument, wherein the first and second transaction instruments comprise a group of transaction instruments, and wherein the information identifies a location of the sale of the first transaction instrument; and the step of associating the location of the sale of the first transaction instrument with the second transaction instrument and/or the group of transaction instruments.

The inventory management system may comprise an issuer system, wherein the issuer system is configured to: produce financial transaction instruments, group a number of the financial transaction instruments, associate the financial transaction instruments with each other, distribute a group of financial transaction instruments to a distributor system, receive information related to the retail distribution of at least one of the financial transaction instruments from the group of financial transaction instruments, and record in inventory the location of the rest of the financial transaction instruments associated with that group after a first card in that group is distributed.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

In accordance with various exemplary embodiments of the invention, a inventory management system is configured to 'locate' a group of financial transaction instruments after at least one of the financial transaction instruments in that group has been sold. Although primarily described herein in terms of financial transaction instruments, and more particularly in terms of financial transaction cards ("cards"), the description herein is equally applicable to other financial transaction instruments and to account numbers associated with financial transaction accounts.

Figure 1:
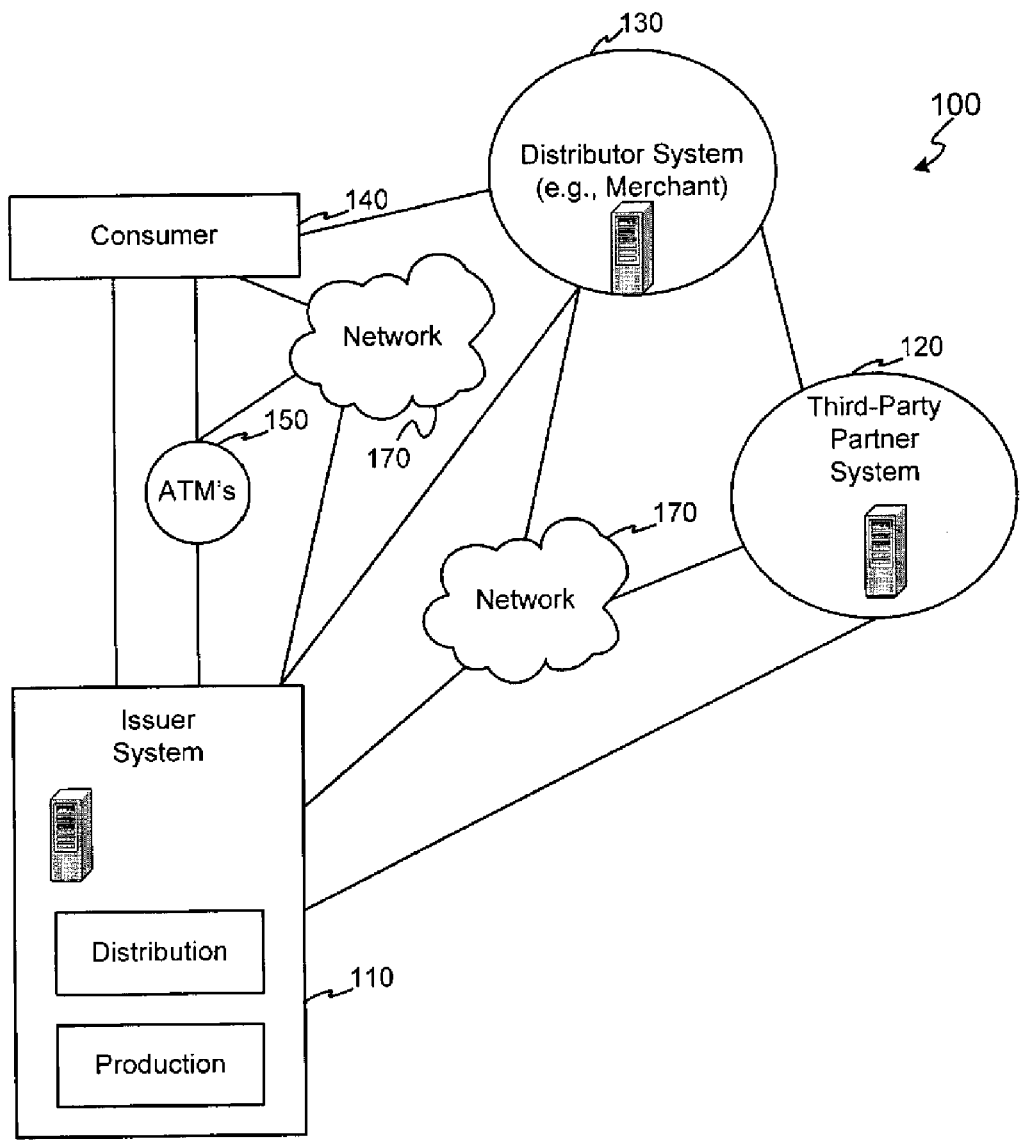
FIG. 1 illustrates a block diagram overview of an exemplary transaction instrument inventory and distribution system.

An exemplary system configuration may include, with reference to FIG. 1, a transaction instrument distribution system and inventory management system 100 which comprises an issuer system 110 and a distributor system 130. System 100 may also comprise a third-party partner system 120. Issuer system 110 may be any person, entity, software and/or hardware which may issue a transaction instrument to a consumer 140 through a distributor 130 and/or a third-party partner 120. Distribution system 130 is any person, entity, software and/or hardware which may distribute the transaction instrument to consumer 140. For example, distribution system 130 may be a merchant. Moreover, distribution system 130 may be, for example, a retail mall merchant. Furthermore, third-party partner system 120 may serve as an intermediary between distribution system 130 and issuer system 110. Consumer 140 may use the transaction instrument with various merchants 130, automated teller machines ("ATMs") 150, and/or the like. Thus, issuer system 110 may be suitably configured to communicate with third-party partner system 120, merchant system 130, consumers 140, and/or ATMs 150. In these examples, communications between any of these components may take place in various manners, for example, via a network 170, or via other modes of communication discussed herein or known in the art.

The systems and/or components of the systems discussed herein may also include one or more host servers or other computing systems including a processor suitably configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including distribution data, customer data, merchant data, financial institution data and/or like data that could be used in association with the invention. As those skilled in the art may appreciate, a computer may also include an operating system (e.g., Windows NT, 95/98/2000, Linux, Solaris, etc.) as well as various conventional support software and drivers typically associated with computers.

In one exemplary embodiment of the invention, transaction instrument distribution system 100 is suitably configured to facilitate distribution of transaction instruments through in-person marketing methods. For example, a transaction instrument, such as an open pre-paid card, may be offered by a distributor, e.g., a merchant. The merchant may present the open pre-paid card, for example, by hanging the card on a rack near the check out stand. In this example, the open, pre-paid card is accessible to the customers who may select one or more pre-denominated cards, and purchase these cards with the rest of their purchases. Displaying the pre-paid card in a readily accessible manner may thus facilitate convenient acquisition of open pre-paid cards by consumers, and may therefore facilitate distribution of the pre-paid cards. In another embodiment, the merchant may keep the cards behind the counter or otherwise maintain the cards in a manner not directly accessible by customers.

Although frequently described herein as an open pre-paid card which is associated with a transaction account, a transaction instrument, as used herein, may be associated with an open account or a closed account system. The transaction instrument may also exist in a non-physical embodiment. For example, a transaction instrument may be distributed in non-physical embodiments such as an account number, frequent flyer account, telephone calling account, and/or the like. Furthermore, a physical embodiment of a transaction instrument may be distributed as a charge card, credit card, debit card, loyalty card, pre-paid card, diner's card, phone card, transponder, and/or the like.

Furthermore, transaction accounts may be associated with various applications that allow the customers to participate in various programs, such as, for example, loyalty programs. A loyalty program may include one or more loyalty accounts. Exemplary loyalty programs include frequent flyer miles, on-line points earned from viewing or purchasing products at websites on-line, and programs associated with diner's cards, charge cards, credit cards, debit cards, hotel cards, and/or the like. Generally, the user is both the owner of the transaction account and the participant in the loyalty program; however, this association is not necessary. For example, a participant in a loyalty program may gift loyalty points to a user who pays for a purchase with his own transaction instrument, but uses the gifted loyalty points instead of paying the monetary value.

In accordance with another aspect of the invention, the transaction instrument may be distributed via any suitable distribution technique. For example, the transaction instrument may be purchased by the distributor and resold to a consumer. In another exemplary embodiment, however, the transaction instrument may be consigned to the distributor who, upon sale to a consumer, pays the issuer. Other distribution techniques may also be employed. For example, transaction instruments may be distributed for free, e.g., as part of a promotional activity.

In one exemplary embodiment, the transaction instrument comprises an open pre-paid card that is un-funded and not activated when on display by a merchant. The card is purchased through the web tool as described herein. In a first example, the card is funded upon purchase by a consumer and enabled (i.e., activated), for example, via an IVR system. In a second example, the web site is configured to send a message, directly or indirectly, to the issuer, wherein the message is configured to fund and activate the card. The open card may be used at a variety of merchants. Thus, transaction instrument distribution system 100 facilitates convenient distribution of transaction instruments.

Although described as a merchant system herein, in general, distributor system 130 may be any service provider, retailer, mall, financial institution, travel agency, or other entity that performs in-person distribution of a transaction instrument. The term 'retail environment' should be construed broadly to encompass any environment where product is accessible to the public for the public's selection, such as where product is accessibly displayed on counters, shelves, display racks, and/or the like. Furthermore, a retail sale or retail distribution refers to the distribution to the end user of the financial transaction instrument as opposed to the distribution or transfer of the financial transaction instrument down through the distribution chain (e.g., from the issuer down to the distributor who provides the financial transaction instrument to the end user). In addition, a distributor may have sub-entities to which financial transaction instruments are distributed and who may distribute the cards. For example, inventory may be assigned, in bundles, to various clerks, kiosks, departments, and/or like entities within a mall or department store.

In accordance with various exemplary embodiments of the invention, distributor system 130 is suitably configured to offer transaction instruments to consumers in a manner whereby the consumers may physically select the transaction instrument. For example, the transaction instrument may be a card and the card may be associated with a package. In this example, the packaged card may be displayed by hanging the package on a rack display. The packaged card may also be displayed by placing the package on a display shelf, in a vending machine, or through other suitable display techniques. These exemplary methods of displaying the package facilitate selection by a consumer of the package. The consumer may then begin the process of acquiring ownership of the package, for example, by picking up the package and adding it to their shopping cart. In other exemplary embodiments, the transaction instrument is distributed without packaging.

Although the invention contemplates the sale of transaction instruments to consumer 140, in other embodiments, transaction instruments may be distributed to merchants or consumers for free. In accordance with other aspects of the invention, distributor system 130 may process purchases and communicate transaction information with issuer 110 upon sale of an item. For example, distributor system 130 may sell DVD's, produce, toys, food, hardware, and/or the like, and may communicate (directly or indirectly) with the issuer of a charge card, credit card, a pre-paid card, and/or the like to reconcile payment for these purchases.

In general, distributor system 130 is similarly configured to communicate with issuer system 110 in connection with the distribution of the transaction instrument. The information communicated may vary depending on the distribution technique used, the type of transaction instrument, the security systems in place, and/or the like. In one exemplary embodiment, distributor system 130 comprises hardware and/or software, such as a cash register, having a point of sale device integrated therein. Distributor system 130 may have a computing center such as a mainframe computer. However, the computing center of distributor system 130 may be implemented in other forms, such as a personal computer, a mini-computer, a PC server, a network set of computers, or the like.

The computer is suitably configured to receive input identifying the transaction instrument to be distributed. For example, the computer may be suitably configured to scan a bar code associated with the transaction instrument and receive information identifying the card being purchased. The computer may further be suitably configured to compare the identifying information to inventory recorded in a database, to receive or look up the sales price, and/or to calculate the sales price associated with the transaction instrument.

In one embodiment, for example, a third-party partner account number is scanned from the package holding a pre-paid card and the purchase price is looked up from inventory. The third-party partner account number, the purchase price of the card, and the merchant's own identification number may be communicated to the third party partner who may convert the third-party partner account number to the issuer's corresponding account number and forward this information to the issuer.

Furthermore, the merchant computer may be suitably configured to send a Fund/Init or Fund/Activate message (as defined herein) to the issuer. The Fund/Init or Fund/Activate message may be a message that requests approval of sale of the transaction instrument. The Fund/Init or Fund/Activate message may, in one embodiment, be communicated along with the account number, price, and merchant number information just described, and may also pass through the third-party partner system. The computer may also be suitably configured to receive an 'approved/authorized' message that authorizes the sale of the pre-paid card. Furthermore, the Fund/Init or Fund/Activate message may be a message that causes the transaction account to be funded upon distribution of the related transaction instrument. Moreover, the Fund/Init or Fund/Activate message may be sent, substantially in real time (i.e., at about the time of the distribution/sale of the transaction instrument). In addition, the Fund/Init message may be a message that is configured to cause the transaction account to not be activated at the time of distribution/sale of the transaction instrument. However, the Fund/Activate message may be a message that is further configured to cause the transaction account to be activated upon distribution/sale of the transaction instrument.

Distributor system 130 may also communicate other information with issuer system 110 (directly or indirectly). In one exemplary embodiment, the information communicated includes the consumer name, an account number, a sequential number, the date of distribution of the transaction instrument, the time of distribution, the place of distribution, the name of the sales clerk, the entity responsible for the distribution, the type of transaction instrument distributed, and/or the like. The communicated information may be useful for reverse tracking of inventory as described further herein. The communicated information may also be useful for the issuer and distributor to reconcile amounts owed between themselves, to track inventory, to limit fraud, to activate the transaction account, and/or to facilitate additional services. This other information may be sent at the time of the purchase, or as a batch process on a periodic basis. The distribution information may, for example, be communicated via batch processing that is performed on a daily basis, in real time, and/or at some other appropriate interval. The distribution information may be communicated to issuer 110 directly in electronic format, e.g., via a web page, or indirectly in a verbal, or printed format that later is entered in electronic format into issuer system 110.

The distributor system 130 may include a computer that may be suitably configured to access a suitable website or other Internet-based graphical user interface that is accessible by users. In another example, the distributor system 130 may include a computer that may be suitably configured to access a suitable website or other Internet-based graphical user interface that is provided by issuer system 110. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "web page" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

Issuer system 110 may include any software, hardware, financial institution, credit card company, bank, business, and/or the like that is capable of issuing a transaction instrument. Issuer system 110 may also be suitably configured to receive a Fund/Init message, process a request for sale of a transaction instrument, and/or return an authorization/approval message. Furthermore, issuer system 110 may include an internet accessible web site configured to facilitate distribution of transaction instruments.

In accordance with exemplary embodiments, issuer system 110 may include a production system for producing physical embodiments of transaction instruments and/or for creating the associated transaction accounts. In addition, issuer system 110 may comprise systems that are configured to track inventory, receive information from distributor system 130, receive information from third-party partner system 120, identify fraud, replace lost transaction instruments, send commission payments, receive amounts owed, perform accounting, and/or the like for transaction instruments and/or associated transaction accounts.

By way of example, issuer system 110 may be a financial institution that issues a pre-paid card to distribution system 130, e.g., a merchant. For example, issuer system may consign the transaction instrument to the merchant. In this example, issuer system 110 may further pay a commission to the distributor and/or receive payment from the distributor.

In another exemplary embodiment, issuer system 110 is configured with, for example, a card authorization system that may be suitably configured to receive a message from a point of sale device at distributor system 130. The card authorization system may be suitably modified to recognize a Fund/Init message from distributor system 130. For example, a Fund/Init message may be similar to a standard transaction message with one or more fields changed to indicate that a customer desires to acquire a particular transaction instrument. The field(s) that is changed may comprise, for example, Message Type Indicator, Processing Code, and/or Function Code. Upon recognizing the Fund/Init message, the card authorization system may be suitably configured to send a message to a processing system. For example, with reference to a stored value card, a message may be passed to a stored value card processing system (e.g., SVCAP).

The stored value processing system may comprise a logic system that can check to see if the card status is 'already sold', and/or whether the card status is 'at the merchant'. In one exemplary embodiment, the stored value processing system may query an appropriate database to check the card status. Furthermore, the stored value processing system may, upon determining that the card can be sold, (1) adjust the card status in the database to 'sold', and/or (2) send an authorization message back, through the card authorization system, to the point of sale device.

In another exemplary embodiment, the internet accessible website (web tool) may be configured to interact with the card authorization system. The web site may utilize an internet connection or dedication network connection specifically routed to the authorization network of the issuer. For example, the website may be given a specific port to access on an internet enabled Stratus box that is enabled for only that distributor application. Furthermore, other methods may suitably be used to communicate between the website and the card authorization system. Thus, a message may be communicated from the web site to the card authorization system requesting authorization to distribute the transaction instrument. The card authorization system may communicate with, for example, the SVCAP which may determine if authorization is appropriate, adjust the status of the transaction instrument to 'sold', and send an authorization message back, through the card authorization system to the web site. The web site may further be configured to display an 'approved/authorized' message or a 'declined/deferred' message. The web site may be further configured to fund a transaction instrument for a pre-denominated amount and/or for a variable load amount.

In one exemplary embodiment, and with momentary reference to FIG. 5, issuer system 110 may be further configured with an interactive voice response system ("IVR") that may be suitably configured to receive a request from a customer to activate a purchased transaction instrument (e.g., card). The IVR may be suitably configured to check an appropriate database and determine if the status of the card is "sold". The IVR may also be configured to inform the customer, if the card status happens to be 'sold', that the card is activated and/or to activate the card. For example, the card may be activated by adjusting the status of the card in a suitable database.

Issuer system 110 may also include, for example, an established system for creating Travelers Cheques, for delivering the Travelers Cheques to distributors, and for tracking inventory, preventing fraud, replacing lost transaction instruments, sending commission payments, receiving amounts owed, performing accounting, and/or the like. These established Travelers Cheque infrastructures may, in accordance with one aspect of the invention, be leveraged to perform similar functions for the distribution of transaction instruments. Although described herein as Travelers Cheque infrastructures, it should be understood that issuer system 110 may include any pre-existing inventory and financial settlement processing system, which operates using serial number logic, and that a Travelers Cheque system is merely one example of such a system. Thus, issuer system 110 may, in accordance with one aspect of the invention, avoid the creation of new systems that facilitate this new method of distributing transaction instruments. Therefore, issuer system 110 may leverage a Travelers Cheque infrastructure to receive information received from merchant system 130 and leverage a Travelers Cheque and/or transaction account infrastructure to process the information and/or to provide other services related to the pre-paid card. For additional information related to leveraging a Travelers Cheque infrastructure, see for example, U.S. Non-Provisional patent application Ser. No. 10/707,779, filed Jan. 12, 2004, entitled "SYSTEMS, METHODS, AND DEVICES FOR SELLING TRANSACTION ACCOUNTS", which is incorporated herein by reference.

In various exemplary embodiments, issuer system 110 may distribute transaction instruments to consumers 140 using an intermediary third-party partner system 120. Third-party partner system 120 may be suitably configured to perform many of the tasks discussed with reference to issuer system 110 and/or distributor system 130. Furthermore, in this exemplary embodiment, merchant 130 may be suitably configured to send the Fund/Init message to third-party partner system 120 and to receive an approved/authorized message from partner system 120. Similarly, issuer system 110 may be suitably configured to receive a Fund/Init message from partner system 120 and to provide an approved/authorized message to partner system 120. In accordance with an exemplary embodiment, third-party partner system 120 may also comprise a database for converting the identification number associated with the transaction instrument from a third party partner's number to the issuer's number.

As used herein, the terms "user", "end user", "consumer", "customer" or "participant" may be used interchangeably with each other, and each shall mean any person, entity, machine, hardware, software, business, issuer system, and/or distributor system. A user may acquire by gift, purchase, or the like, a transaction instrument, for example, an open pre-paid card, and may use that card at different merchants to complete a purchase. Also, each user may be equipped with a computing system to facilitate online commerce transactions. For example, the user may have a computing unit in the form of a personal computer, although other types of computing units may be used including laptops, notebooks, hand held computers, set-top boxes, and/or the like. The user computer may be in a home or business environment with access to a network. In an exemplary embodiment, access may be through the Internet through a commercially available web-browser software package.

Furthermore, the terms "business" or "merchant" may be used interchangeably with each other and shall mean any person, entity, distributor system, software and/or hardware that is a provider, broker and/or any other entity in the distribution chain of goods or services. For example, the merchant may be a grocery store, an on-line merchant, and/or the like. With regard to use of the open transaction instrument, the user may communicate with the merchant in person (e.g., at the box office), telephonically, or electronically (e.g., from a user computer via an internet). During the interaction, the merchant may offer goods and/or services to the user. The merchant may also offer the user the option of paying for the acquisition using a transaction instrument. Furthermore, the transaction instrument may be used by the merchant as a form of identification of the user. The merchant may have a computing unit implemented in the form of a computer-server, although other implementations are possible.

In general, the transaction instrument may be used for transactions much like other transaction instruments. Communication between the user and/or merchant and the system of the invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the invention may consist of any combination of databases or components at a single location or at multiple locations, wherein each database or system includes any of various suitable security features, such as firewalls, access codes, encryption, de-encryption, compression, decompression, and/or the like.

It may be appreciated that many applications of the invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant (e.g., Palm Pilot®), handheld computer, cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the system may contemplate the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., GILBERT HELD, UNDERSTANDING DATA COMMUNICATIONS (1996), hereby incorporated by reference.

The distributor, third-party partner, and/or the issuer may be interconnected via a second network and/or a third network, each referred to as a payment network. The payment network which may be part of certain transactions represents existing proprietary networks that presently accommodate transactions for charge cards, credit cards, debit cards, and other types of financial/banking cards. The payment network is a closed network that is assumed to be secure from eavesdroppers. Exemplary transaction networks may include the American Express®, VisaNet® and the Veriphone® networks.

Any databases discussed herein may be any type of database, such as relational, hierarchical, graphical, objectoriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

In general, an exemplary method comprises the steps of producing the cards, grouping a number of cards, associating the cards with each other and/or the group, keeping the card group together during the process of distributing the card groups to the merchants, distributing at least one of the cards in the card group, and recording in inventory the location of the remaining cards of that group after a card in that group is first distributed.

Figure 2:
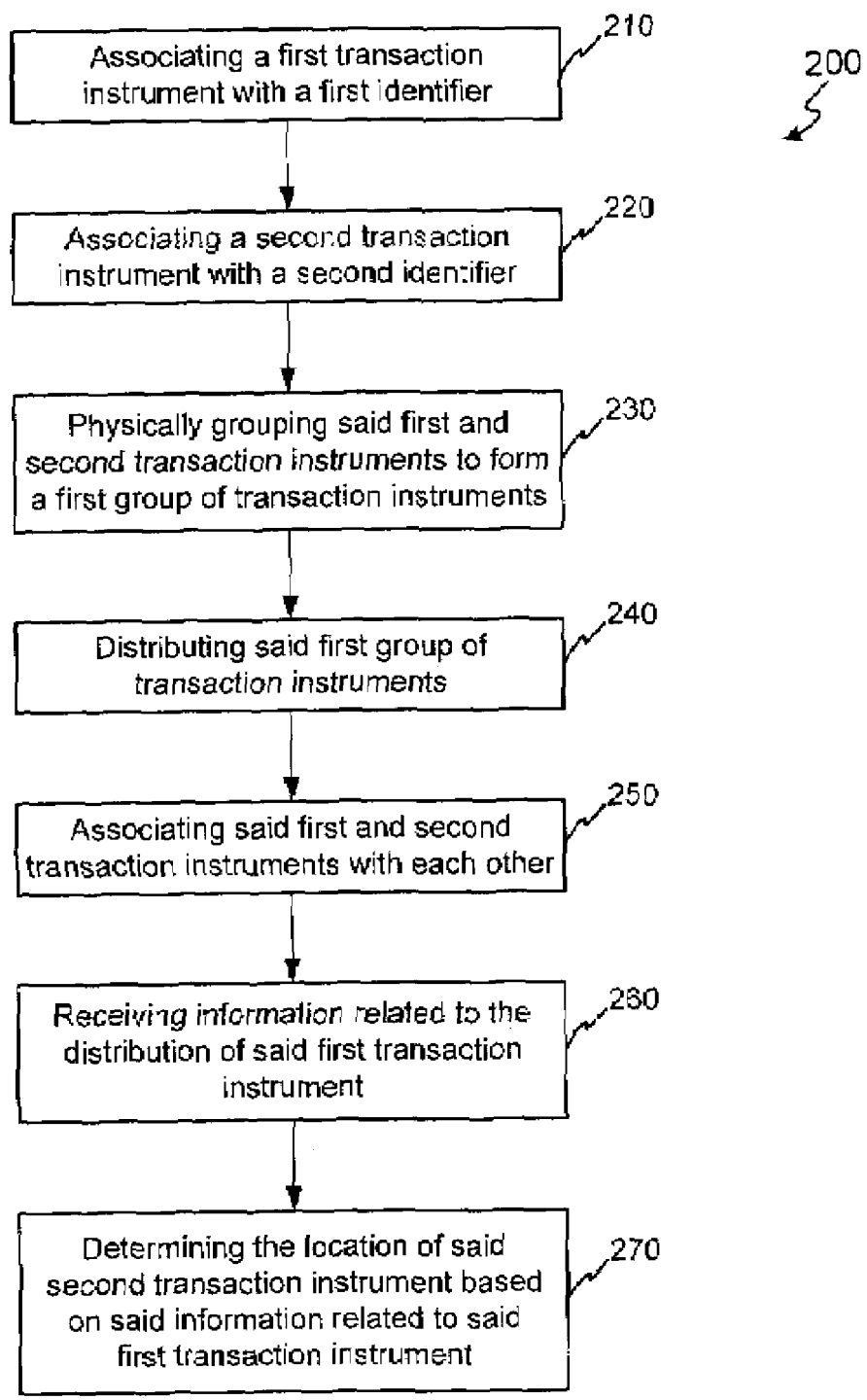
FIG. 2 illustrates a flow diagram showing an exemplary inventory management method.

In accordance with another exemplary embodiment, and with reference to FIG. 2, a method 200 of facilitating inventory management in a financial transaction instrument distribution system may comprise the steps of producing financial transaction instruments, physically grouping more than one financial transaction instrument (step 230), distributing the group of financial transaction instruments (step 240), associating the grouped financial transaction instruments with each other (step 250), receiving information related to the distribution of a financial transaction instrument (step 260), and determining the location of other financial transaction instruments that are in the same group as the financial transaction instrument that was distributed (step 270). Exemplary embodiments of some of these steps are described in more detail below.

Distribution of financial transaction instruments includes the distribution of account numbers, which are associated with financial transaction accounts. For example, an account number may be written on a paper that is distributed and later purchased. Although the invention contemplates all forms of distribution of financial transaction instruments and account numbers, for simplicity, an exemplary embodiment of the invention is described herein in terms of a distribution of a pre-paid card or a credit/charge card (a "card").

The issuer of a card may produce the card and/or packaging associated with the card. This may be accomplished, for example, through third-party production vendors (e.g., Oberthur Card Systems). The cards may be individually packaged, although in other embodiments, one, two, or more cards may be packaged for retail sale together ('retail sale package'). However, in various exemplary embodiments, the retail sale package comprises just the card itself. In one exemplary embodiment, a card may be placed in a cardboard or plastic container that is configured to securely hold the card and/or conceal all or portions of the card. In other embodiments, a hook may be removeably attached to the card. Furthermore, many other packaging methods may be used to prepare the cards for distribution.

Similarly, other types of financial transaction instruments may be suitably packaged for retail sale. For example, an account number associated with a financial transaction account may, for example, be printed on a paper or other object that is packaged for retail sale. As described in greater detail herein, the financial transaction instruments and/or retail packages may be associated with identifiers (steps 210 and 220). This association may be partially or completely produced by the production vendor, the issuer system, and/or both systems working together.

The individual retail sales package is configured to be uniquely identifiable. Thus, a unique identifier is associated with each retail sales package. The unique identifier may be formed with numbers, letters, symbols, and/or the like. In other exemplary embodiments, the unique identifier is a serial number. For example, the serial numbers may be sequential numbers within each distribution group of individual retail sales packages. However, it is noted that in some embodiments, the unique identifier may be a random number associated with the retail sales package. Typically, the unique identifier is a separate identifier from the account number associated with the financial transaction account, financial transaction instrument, or debit/credit card. However, in one embodiment, the unique identifier is the account number.

For simplicity, the unique identifier is described herein as being associated with the card. However, the unique identifier may be associated with at least one of the individual retail sales package, with the card, or other packaged object. Furthermore, the unique identifier (or any other identifier discussed herein) may be in the form of a printed indicia, bar code, electronic identifier (e.g., on a smart card, coded in a transponder), stored on a magnetic stripe, and/or the like. In other embodiments, the unique identifier is printed on the card or package. In accordance with another exemplary embodiment of the invention, a unique group identifier may be associated with each distribution group (as described herein).

In one exemplary embodiment, the cards are each configured to have a serial number. For example, the cards may have a serial number printed on the surface of the card. In another example, the serial number may be incorporated into the magnetic stripe or stored in a machine readable manner on the card. Furthermore, the serial number may be a sequential number such as, for example, Traveler's Cheque numbers. The unique identifier, account number, unique group identifier, number of cards in the group, and/or like information may be stored in a database, look up table, and or the like.

In accordance with one exemplary embodiment of the invention, the individual retail sale package is grouped together with other individual retail sale packages. (Step 230). The groups (or bundles) may comprise two or more packages. Although any number of individual retail sale packages may comprise a group of cards, in one embodiment, 25 individual retail sale packages are packaged together to form a group ("distribution group"). Moreover, the number of retail sale packages in a bundle may vary from bundle to bundle. The number of cards in a bundle may be varied, for example to suit a specific retailer's requirements. Furthermore, the type of card or package may vary within the bundle or from bundle to bundle. For example, one bundle may contain a variety of packages each holding one, two, or six cards. In another example, one bundle may contain retail packages each containing one card and another bundle may contain retail packages each containing two cards. Similarly, the valuation of prepaid cards and other similar types of information may vary from package to package or from bundle to bundle, and/or the like.

Figure 3:
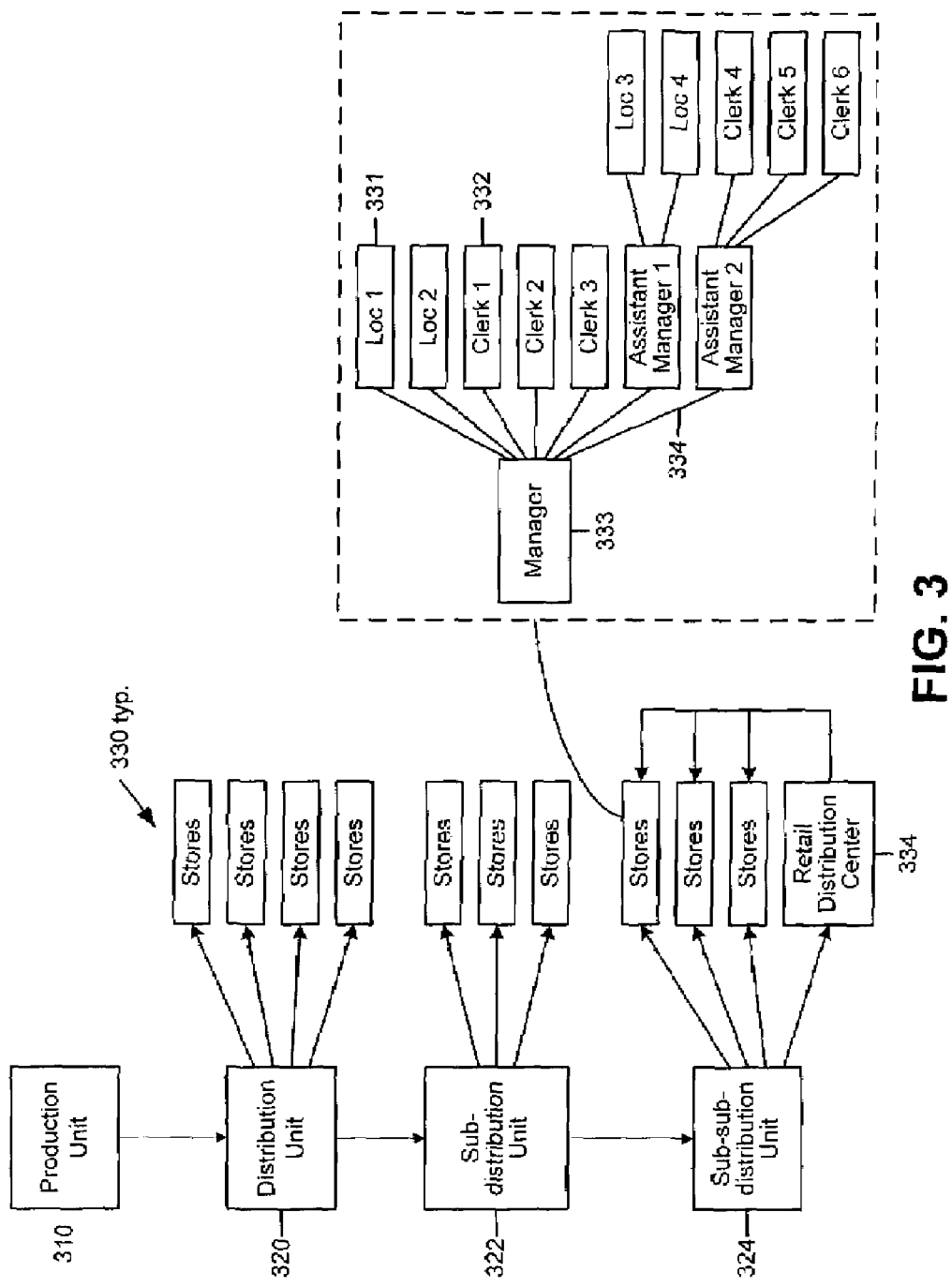
FIG. 3 illustrates a block diagram of an exemplary distribution channel.

The production vendor may be configured to ship a bundle (distribution group) of cards directly to issuer 110, or to third-party distribution vendor 120. System 100 may further be configured to transfer/distribute the bundles through a distribution chain to the retail distributor. With reference to FIG. 3, an exemplary distribution chain is illustrated as having a production vendor 310, a distribution unit 320, a sub-distribution unit 322, a sub-sub-distribution unit 324, a retail distribution center 334, and stores 330. In accordance with various exemplary embodiments of the invention, issuer 110, third-party distribution vendor 120, distribution center 334, and/or a combination of these entities may transfer/distribute the bundles/groups through a distribution chain to retailers, stores, merchants, and/or the like ("retailers"). One exemplary third party distribution vendor is Incomm. The distribution vendor(s) may transfer/distribute the card bundles intact through out the supply chain/stages of distribution to retailers.

For example, production vendor 310 may ship several bundles to distribution unit 320 which may in turn ship a portion of those bundles to sub-distribution units 322. Sub-distribution unit 322 may transfer/distribute a portion of the bundles it receives to sub-sub-distribution unit 324. Any of these distribution entities (e.g., 310, 320, 322, and/or 324) may be configured to transfer/distribute a portion of the bundles they posses to stores or to a retail distribution center 334 related to stores 330. Although described herein as a store, the store may be any entity as described with respect to distribution system 130 and merchants herein.

Upon receipt of a bundle of cards at a retail selling location, in one exemplary embodiment, the bundle is opened and the individual retail packages are displayed via merchandise stands, racks, counters, and/or the like, for distribution to consumers. In yet another embodiment, the card bundles received by a retailer may be transferred/assigned, intact, to a particular department, check out stand, sub-entity, kiosk, employee, and/or the like associated with the retailer. In that example, upon reaching the location associated with the retailer, the bundle may be opened and the individual retail packages may be offered to customers. For example, a store may transfer intact bundles to particular locations 331 within the store, to specific clerks 332 within the store, or to managers/assistant managers (e.g., 333 and 334) within the store. The managers/assistant managers may further transfer the bundles. Thus, identifying the location of a financial transaction instrument/retail sale package may include determining the physical location of the retail sales package and/or card. Furthermore, identifying the 'location' of a financial transaction account/retail sale package may include identifying the name of the store, the identification of the clerk, the identification of the manager/assistant manager, the department, the point-of-sale terminal, the building, the country, the entity responsible for the retail distribution of the financial transaction account, and/or in possession thereof, and/or the like.

As described herein, a bundle is a group of financial transaction instruments that remain physically associated with each other through out the distribution chain. However, in another example, a bundle may comprise two or more distinct groups of financial transaction instruments and these groups may be physically separable. In this example, a bundle could be distributed to a number of different physical locations, for example, with some common characteristic. This may be useful to track the inventory based upon that common characteristic. For example, a single bundle comprising several separable groups may be distributed to a 'chain' type retailer that may brake up the groups and distribute the bundle throughout its network of stores. In this embodiment, the location of the inventory may still be identified as being at a particular type of retailer. For example, when the first of the cards from that bundle is sold, the location of all of the cards is known to be at a Brand X store.

Typically, the individual retail packages are sold to the consumers. However, as described herein, the packages may be given away as promotional devices, or may be distributed to consumers in other ways. Furthermore, as described herein, an individual retail sale package may be offered to the consumer in a publicly accessible manner, for example, in high foot traffic areas of the store, and/or within reach of the customers. In other examples, the card is held behind the customer service desk.

In various embodiments, the financial transaction instruments are open financial transaction instruments. As described herein, the ability to track these instruments to the point of sale/point of distribution to customers may facilitate enhanced security and fraud prevention. Furthermore, the ability to track these cards may facilitate re-claim of expired/expiring cards. Thus, the methods and systems for retroactively tracking financial transaction instruments may facilitate providing these instruments to customers in a customer accessible environment, and may thus enhance the distribution of the financial transaction instruments.

When an individual retail package is sold/distributed to a customer, or during the process thereof, the unique identification number associated with that individual retail package is communicated to the issuer. This information may be communicated directly to issuer 110, or by way of intermediate processing. For example, third-party distribution partner 120 may receive the information and pass the information along to the issuer. In one example, a serial number associated with the individual retail package may be communicated to third-party distribution partner 120, which may be configured to translate and/or pass that information along to issuer 110 (step 260). This information may be communicated, for example, with the reconciliation file, as a batch process, and/or the like.

Based on this unique identification number, and or other information that is commonly provided with such communications/reconciliation files, the inventory management system may be configured to determine the location of other the cards associated with that the distributed card's group.

Inventory management system 100 may also be configured to determine whether a card is sold or unsold, at a particular retailer, at a particular sub-entity associated with that retailer, and/or the like ("inventory status"). Inventory management system 100 may also be configured to identify all of the individual retail packages (or all of the remaining un-distributed individual retail packages) that are associated with the bundle to which one unique identification number belonged. Thus, the inventory management system is based on the distribution of at least one card, out of a group of cards, and the assumption that all other cards associated with the same group as that one card are at the same location.

In accordance with an exemplary embodiment of the present invention, inventory management system 100 may be described as a "reverse inventory management system" because, in contrast to systems that track location from production directly through to distribution, system 100 may be configured to identify the location of some inventory after the sale of other related inventory. In this embodiment, the reverse inventory management system is configured to update the inventory status based on transaction data/information that is sent with the sale of inventory to customers.

Information communicated to an issuer indicating that one card has been sold (and the location of that sale) may be used to identify all other cards that were also in that bundle. For example, each card's unique identification number may be associated with the unique ID of every other card, for example in a database/look-up table. By searching the database using the unique ID of the card first sold of a bundle of cards, the system may determine/identify the unique ID numbers of all of the cards that are associated with that bundle. It may be assumed that each of the cards in that bundle, or each of the cards remaining in that bundle, are at that location. In this manner, the inventory data associated with of each card may be updated to reflect the inventory status (e.g., location) of that card.

In another exemplary embodiment, a bundle identifier may be electronically associated with each serial numbered card. Thus, when one card is sold, the serial number of the sold card can be used in a database/look-up table to identify the bundle of which it was a part, and then that bundle identifier can be used to look up all the card serial numbers that were also associated with that bundle.

In yet another exemplary embodiment, a sequential serial number may be associated with each card in a group of, for example, 10 cards. In this example, the number of cards in the group, and the starting serial number for that group, are stored in a database. Therefore, when a card is sold, the system is configured to determine to which group the sold card belongs. For example, when the first card in the group is sold, the card's unique identification number may match an identification number in a database or look up table. Otherwise, the sold card's unique identification number may be within 10 of the first number of the group. For example, the system may add or subtract any number between 1 and 10 from the identification number, then compare the result to an identification number in the table. When a card of that group is first sold, the system may update the record of each card to reflect its inventory status. In one embodiment, the system may update the applicable group's inventory status.

With sequential numbered cards, it may be convenient to only store the serial number of the first card in the bundle and the number of cards in the bundle. Thus, in yet another exemplary embodiment, the unique identification number may correspond to a unique group ID number and the system is configured to determine the group ID number based on the unique ID number of the first sold card. The group ID number is then updated to reflect the inventory status of the group. The location of individual cards may be determined by reference to the location of its corresponding group. Furthermore, other methods may also be used wherein the distribution of one card in a group of cards makes possible tracking and inventory functions with respect to all of the other cards in its group.

As described herein, Travelers' Cheque systems or other pre-existing serial number based inventory systems, and other transaction instrument systems may already be configured to perform inventory functions. The utility of these systems may be leveraged by providing the above determined location information to these pre-existing inventory systems.

In accordance with various exemplary embodiments, each time a card is sold, the inventory status may be updated. Thus, the system may be configured to track changes in the inventory status ("dynamic inventory tracking"). For example, the system may be programmed to alert the issuer if part of a group of cards is distributed by one retailer and then part of the group is distributed by another retailer. The system may also be configured to record the location of each card sold for inventory and fraud prevention reasons. Thus, the system is configured to perform tracking of specific serialized inventory down to the store level or lower for purpose of loss control and inventory management (obsolete product recall, changing terms and conditions, expired product, etc.) In addition, system 100 may be configured to modify the location of all the remaining cards/retail sale packages. In this manner, if inventory moves from one location to another, the inventory status may be updated.

One of the benefits of the invention is that it may tend to increase an issuer's prepaid card business. The ability to track and perform inventory management on cards may tend to improve security and loss prevention methods such that it facilitates distributing the product in open retail environments with enormous foot traffic and sales potential. The inventory management system may also facilitate detailed tracking of specific serialized prepaid cards down to the specific selling location level for purposes of loss control and inventory management. Other benefits may include the lowering of operating expenses. For example, inventory management processes may reduce fraud losses and operational costs related to inventory management. The inventory management system may increase the quantity/quality or performance of the issuer's existing services. For example, the inventory management system may improve the ability for the issuer to service the needs of its selling partners and its end customers for these products. The inventory management system may also facilitate selling of cards through a check-out lane and controlling/reducing associated losses and costs. In addition, the inventory management systems and methods may be configured to leverage pre-existing travelers Cheque inventory systems and/or other serial number based pre-existing inventory systems.

Furthermore, the inventory management system may be advantageous to retailers because in some cases, fraud losses on unsold/inactive cards presented and honored under floor limits at the accepting merchants can be traced back and charged to fraud at the original stocking location. In addition, third party sellers may be able to reduce the amount of additional cost and effort involved to meet issuer requirements for tracking and managing inventory. The inventory management system may facilitate inventory management without additional process or systems at the distribution vendors or at the retail level. Furthermore, it may facilitate integration of shipping and receiving financial transaction products and similar products in order to reduce handling and merchandising overhead.

Moreover, the inventory management system may be advantageous to customers. For example, customers that have accidentally walked away from the retail selling location without completing the sales transaction for their card can be directed back to the appropriate original stocking location to remedy the oversight.

The invention may be described herein in terms of functional block components, optional selections and/or various processing steps. It should be appreciated that such functional blocks may be realized by any number of hardware and/or software components suitably configured to perform the specified functions. For example, the invention may employ various integrated circuit components, e.g., memory elements, processing elements, logic elements, look-up tables, and/or the like, which may carry out a variety of functions under the control of one or more microprocessors or other control devices. Similarly, the software elements of the invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, messaging, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction instrument distribution system.

As may be appreciated by one of ordinary skill in the art, the invention may be embodied as a method, a data processing system, a device for data processing, a financial transaction instrument, and/or a computer program product. Accordingly, the invention may take the form of an entirely software embodiment, an entirely hardware embodiment, or an embodiment combining aspects of both software and hardware or other physical devices. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the invention. The specification and figures are to be regarded in an illustrative manner, rather than a restrictive one, and all such modifications are intended to be included within the scope of invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method of facilitating inventory management in a financial transaction instrument distribution system, the method comprising:

receiving information related to a sale of a first transaction instrument, wherein said first transaction instrument is associated with a first unique identifier, wherein said first unique identifier is associated with a second unique identifier, wherein said second unique identifier is associated with a second transaction instrument, wherein said first and said second transaction instruments comprise a group of transaction instruments, and wherein said information identifies a location of said sale of said first transaction instrument; and associating said location of said sale of said first transaction instrument with at least one of said second transaction instrument and said group of transaction instruments.

2. The method of claim 1, wherein said associating step further comprises storing said location in a database such that said location is associated with said second transaction instrument.

3. The method of claim 1, wherein said associating step further comprises storing said location in a database such that said location is associated with said group of transaction instruments.

4. The method of claim 1, wherein identifying the location of said sale of said first transaction instrument comprises determining a physical location of at least one of a retail sales package and a transaction instrument.

5. The method of claim 1, wherein identifying the location of said sale of said first transaction instrument comprises identifying at least one of an entity responsible for a retail distribution of said first transaction instrument, and an entity in possession of said first transaction instrument, wherein said entities comprise at least one of: a name of a store, an identification of a clerk, an identification of a manager/assistant manager, a department, a point-of-sale terminal, a building, and a country.

6. A method of facilitating inventory management in a financial transaction instrument distribution system, the method comprising:

associating a first transaction instrument with a first identifier;

associating a second transaction instrument with a second identifier;

physically grouping said first and second transaction instruments to form a group of transaction instruments;

transferring said group of transaction instruments to a distributor;

associating said first and second identifiers to each other;

receiving information related to a distribution of said first transaction instrument by said distributor; and determining a location of said second transaction instrument based on said information and said association of said first and second identifiers.

7. The method of claim 6, wherein said first and second identifiers are the same identifier and identify said group of transaction instruments.

8. The method of claim 6, wherein said information includes an identifier of said distributor, and wherein said identifier may be used to determine said location of said distribution of said first transaction instrument.

9. The method of claim 6, wherein said information comprises a request for authorization to sell said first transaction instrument, wherein said request is sent by said distributor and requested of an issuer.

10. The method of claim 6, wherein said step of transferring said group of transaction instruments to said distributor comprises transferring said group of transaction instruments to sub-distributors in a distribution chain.

11. The method of claim 6, wherein the step of transferring said group of transaction instruments to said distributor further comprises transferring said group of transaction instruments to an internal distributor, and wherein said determining step comprises determining said location within a building associated with said distributor of said second transaction instrument.

12. An inventory management system for facilitating the distribution of financial transaction instruments comprising: an issuer system, wherein said issuer system is configured to produce financial transaction instruments, group a number of said financial transaction instruments, associate said financial transaction instruments with each other in a database, transfer a group of financial transaction instruments to a distributor system, receive information related to a retail distribution of at least one of said financial transaction instruments from said group of financial transaction instruments, and update an inventory management database to identify the location of the remainder of the financial transaction instruments associated with said group of financial transaction instruments after a first financial transaction instrument in that group is distributed.

13. A reverse inventory management method for facilitating distribution of financial transaction instruments, the method comprising:

receiving information related to said distribution of a first retail sale package containing a first transaction instrument, wherein said retail sale package is associated with a second retail sale package containing a second transaction instrument, wherein said first and second retail sale packages comprise a distribution group, and wherein said information identifies a location of a sale of said first retail sale package; and associating said location of said sale of said first retail sale package with said second retail sale package to facilitate determining a location of said second retail sale package in an inventory system.

* * * * *

UNITED STATES PATENT AND TRADEMARK OFFICE
CERTIFICATE OF CORRECTION

| | |
|---|---|
| PATENT NO. | : 7,281,653 B2 |
| APPLICATION NO. | : 10/905889 |
| DATED | : October 16, 2007 |
| INVENTOR(S) | : Randy Beck et al. |

It is certified that error appears in the above-identified patent and that said Letters Patent is hereby corrected as shown below:

DRAWINGS SHEET 1

Fig. 1, "ATM's" should read --ATMs--.

COLUMN 1

Line 50, "chain of a" should read --chain of--.

COLUMN 2

Line 11, "for of" should read --for--.

COLUMN 5

Line 40, "DVD's," should read --DVDs,--.

COLUMN 13

Line 14, "and" should read --and/--.
Line 52, "through out" should read --throughout--.
Line 61, "posses" should read --possess--.

COLUMN 14

Line 35, "brake" should read --break--.

UNITED STATES PATENT AND TRADEMARK OFFICE
CERTIFICATE OF CORRECTION

PATENT NO. : 7,281,653 B2
APPLICATION NO. : 10/905889
DATED : October 16, 2007
INVENTOR(S) : Randy Beck et al.

It is certified that error appears in the above-identified patent and that said Letters Patent is hereby corrected as shown below:

COLUMN 15

Line 13, "the cards" should read --cards--; and "that" should be deleted
Line 48, "with of" should read --with--.
Line 65, "look up" should read --look-up--.

Signed and Sealed this

Sixth Day of May, 2008

JON W. DUDAS
*Director of the United States Patent and Trademark Office*